United States Patent Office 3,282,837
Patented Nov. 1, 1966

3,282,837
HYDROXY THIOPHOSPHONOXY
GLYCERIDE ESTERS
David D. Reed, Glenham, N.Y., and Herman D. Kluge, deceased, late of Fishkill, N.Y., by Hazel E. Kluge, administratrix, Fishkill, N.Y., and Joseph F. Lyons, Poughkeepsie, N.Y., assignors to Texaco Inc., New York, N.Y., a corporation of Delaware
No Drawing. Filed June 5, 1963, Ser. No. 286,136
7 Claims. (Cl. 252—46.6)

This invention relates to novel reaction products of epoxidized unsaturated fatty acid triesters of glycerol and hydrocarbonthiophosphonic acids. It further relates to the preparation of the novel reaction products and to lubricants containing said products.

The reaction products of the epoxidized fatty acid triesters of glycerol and hydrocarbonthiophosphonic acid hereafter known for reasons of brevity as the hydroxy thiophosphonoxy glycerides are the complex products derived from contacting a hydrocarbonthiophosphonic acid of the formula:

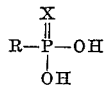

with an epoxidized glyceride of the formula:

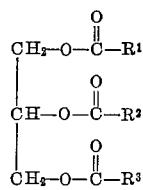

where X is sulfur or a mixture of a major amount of sulfur and a minor amount of oxygen, where R is a hydrocarbyl (monovalent hydrocarbon derived radical), and $R^1$, $R^2$, and $R^3$ are epoxidized saturated aliphatic hydrocarbon radicals (epoxyalkyl), each having 1 to 3 epoxy groups substituted thereon. The reaction between the thiophosphonic acid and epoxidized unsaturated fatty acid triester of glycerol is best explained by the following exemplary equation:

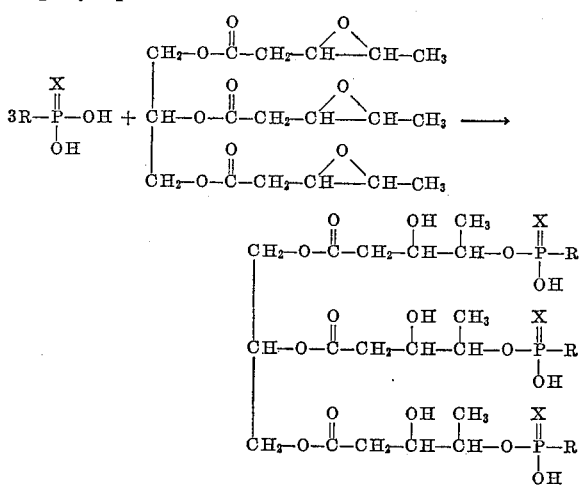

In the above described reaction whether the hydroxyl groups or thiophosphonoxy groups are formed on the 1 or 2 position carbon of the epoxy group is the random choice of the reaction. Further although in the above reaction stoichiometric quantities of reactants were employed, if less than a stoichiometric quantity of hydrocarbonthiophosphonic acid is utilized not all the epoxy groups will be reacted and those that do react will again be a random choice of the reaction.

PREPARATION OF THE THIOPHOSPHONIC
ACID REACTANT

As is well known, hydrocarbon-$P_2S_5$ reactant products are prepared by the reaction of aromatic hydrocarbons, cycloaliphatic hydrocarbons and aliphatic hydrocarbons with $P_2S_5$ at elevated temperatures. Although a wide variety of hydrocarbons such as aliphatic-substituted aryl compounds and aryl-substituted aliphatic compounds are usable as the hydrocarbon reactant, monoolefins are generally employed as the hydrocarbon reactant. Lubricating oil fractions constitute another preferred class of materials for reaction with $P_2S_5$ to form a product which after further treatment as outlined below is converted to the hydroxy thiophosphonoxy glyceride of the invention.

The olefinic hydrocarbons reacted with $P_2S_5$ usually contain at least 12 carbon atoms although lower molecular weight olefins can be employed. Monoolefinic hydrocarbons such as polymers of alkenes, e.g., polybutenes (including polyisobutene), polypropene and copolymers of mixed alkenes, e.g., propene-isobutene copolymers are preferred materials for reaction with $P_2S_5$. In general, monoolefinic hydrocarbon polymers and copolymers having an average molecular weight between about 250 and 50,000 are employed with polymers and copolymers having an average molecular weight in the range from 600 to 5,000 being particularly preferred. Copolymers from 600 to 5,000 being particularly preferred. Copolymers of conjugated diene hydrocarbons and monoolefinic hydrocarbons such as copolymer of butadiene and isobutene having an average molecular weight in the above prescribed range also react with $P_2S_5$. Particular preferred monoolefinic polymers are polybutene polymers, e.g., polyisobutylene, having an average molecular weight between 500 and 5,000.

Olefins useful for reaction with the $P_2S_5$ are also prepared by halogenation of high molecular weight hydrocarbon fractions and subsequent dehydrohalogenation. Olefin fractions obtained by cracking of high molecular weight hydrocarbon fractions may also be used as the hydrocarbon reactant.

The hydrocarbonthiophosphonic acid reaction product obtained by reacting $P_2S_5$ (about 5–40 wt. percent of reaction mass) with a hydrocarbon at a temperature of from about 100–320° C. in an inert atmosphere, for example, under a blanket of nitrogen, is then contacted at a temperature between about 100 and 260° C. with steam. Steam treatment hydrolyzes the hydrocarbon-$P_2S_5$ reaction product to a hydrocarbonthiophosphonic acid and inorganic phosphorus acid. The hydrocarbonthiophosphonic acid has the general formula:

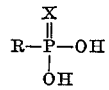

wherein R is derived from the charge hydrocarbon and is usually a monoolefinic radical containing 20 to 200 carbon atoms, X is sulfur or a mixture of sulfur and oxygen. X in the above formula is designated as sulfur or a mixture of sulfur and oxygen because the steam hydrolysis step usually results in the replacement of a portion of the sulfur joined to the phosphorus with oxygen. Therefore when X is defined as a mixture of sulfur and oxygen a mixture of the following product is intended:

(A)
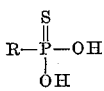

(B)
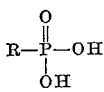

with Product A predominating.

The inorganic phosphorus acids formed during hydrolysis are removed prior to reaction with the epoxidized glyceride reactant. A number of different procedures are available for removal of the inorganic phosphorus acids. In U.S. Patents Nos. 2,951,835 and 2,987,512 removal of the inorganic phosphorus acids is effected by contact with synthetic hydrous alkaline earth metal silicates and synthetic hydrous alkali metal silicates, respectively. Commonly-assigned copending application Serial No. 841,668, filed September 23, 1959, now U.S. Patent No. 3,135,729, by H. D. Kluge and R. G. Lacoste, describes a process wherein inorganic phosphorus acids are removed from the hydrolyzed product by extraction with anhydrous methanol.

EPOXIDIZED UNSATURATED FATTY ACID TRIESTER OF GLYCEROL REACTANT

As heretofore stated, the epoxidized glyceride reactant contemplated herein may be described by the general formula:

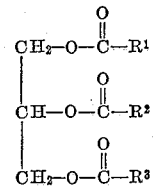

where $R^1$, $R^2$ and $R^3$ are epoxyalkyls of from 3 to 17 carbons containing from 1 to 3 epoxy groups. One method of preparing epoxidized glyceride reactants is contacting at room temperature, e.g., 20–25° C., an unsaturated fatty acid glyceride such as trioleic, trilinoleic and trilinolenic glycerides with an organic peracid such as perbenzoic acid wherein the unsaturated carbon bonds in the fatty acid residues are replaced by epoxy groups.

One excellent source of material for the fatty acid residues in the unsaturated fatty acid triester glyceride reactants contemplated herein are the vegetable oils such as rice bran oil, safflower oil, sesame oil, soybean oil, sunflower seed oil, sorghum oil, walnut oil, wheat germ oil, and corn oil.

Specific examples of the epoxidized unsaturated fatty acid triester glycerides contemplated herein are as follows:

(a)
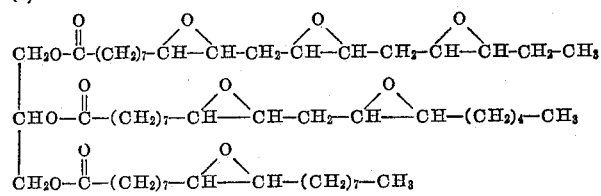

(b)
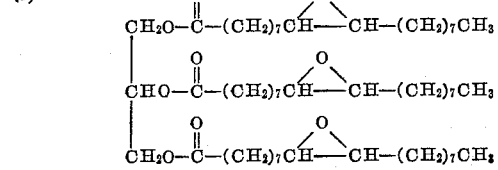

(c)
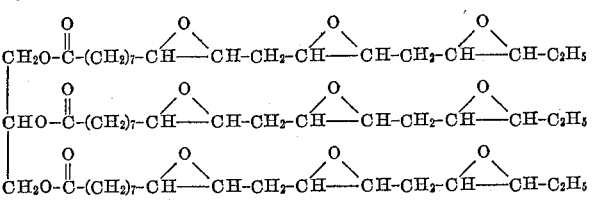

(d)
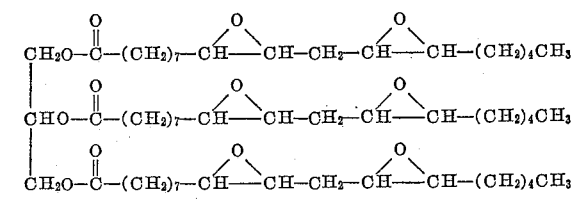

(e)
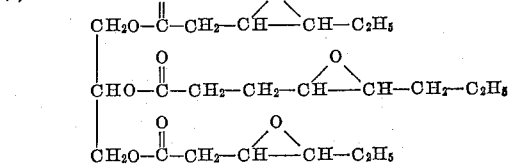

PREPARATION OF THE NOVEL THIOPHOSPHONOXY GLYCERATES

The hydroxy thiophosphonoxy glycerides are prepared by contacting an epoxidized unsaturated fatty acid triester glyceride with the hydrocarbonthiophosphonic acid at a temperature between about 50 and 100° C. in a mole ratio of said glyceride to said acid of between about 0.1:1.0 and 1.0:1.0. Although subatmospheric and superatmospheric pressures may be employed, atmospheric pressure is normally utilized. The employment of inert, liquid, organic solvent in the reaction is optional. Examples of inert solvent that can be employed are alkanes, halogenated alkanes, aromatic hydrocarbons such as hexane, perfluoroethane, benzene and xylene. The hydroxy thiophosphonoxy glycerate product can be purified, if desired, by standard means such as chromatography, washing with aqueous base, or solvent extraction. Specific examples of the hydroxy thiophosphonoxy glycerides contemplated herein are as follows:

(a)
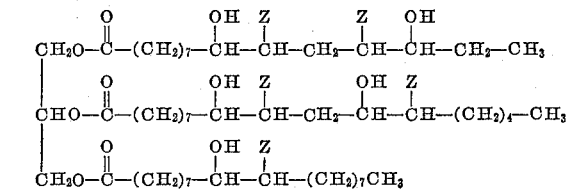

where Z is

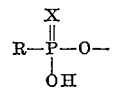

R is a polybutene derived radical having an average molecular weight of about 940 and X is a mixture of a major portion of sulfur and a minor portion of oxygen.

(b)
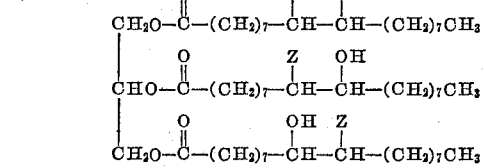

where Z is

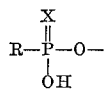

R is a polypropylene derived radical of an average molecular weight of 1500 and X is sulfur.

(c)

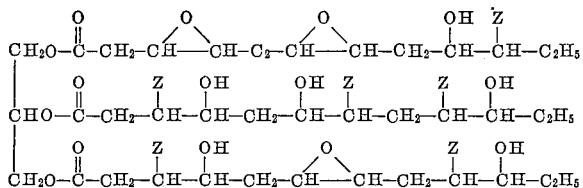

where Z is

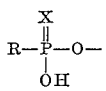

R is a copolymer of isobutylene and propylene of an average molecular weight of 2500 and X is sulfur.

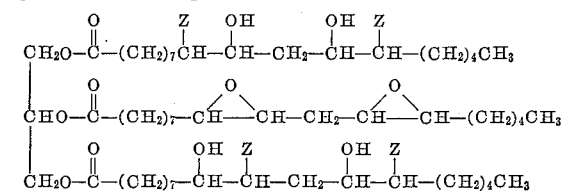

where Z is

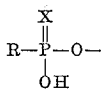

where R is polyisopentylene derived of an average molecular weight of 2000 and X is a mixture of a major portion of sulfur and a minor portion of oxygen.

As heretofore stated, the reaction of the hydrocarbonthiophosphonic acid with the epoxy groups in the unsaturated fatty acid triester glyceride is a random reaction and, therefore, when we speak of the hydroxy thiophosphonoxy glyceride reaction product, we are in actuality speaking of mixtures of specific products. For example, if epoxidized, trilinoleic glyceride is reacted with polyisopentylene thiophosphonic acid, in addition to the hydroxy thiophosphonoxy glyceride produced in the structural formula "d" above, other hydroxy thiophosphonoxy trilinoleic glycerides are produced. For instance, products are produced wherein all the epoxy groups are replaced by the thiophosphonoxy and hydroxy groups where only one of the epoxy groups is replaced. Further, since crude initial source materials for the epoxidized unsaturated fatty acid triester glyceride reactant can be employed such as the vegetable oils, which are actually a mixture of unsaturated fatty acid glycerides, the contemplated hydroxy thiophosphonoxy glyceride product can also include mixtures of glycerides having varying ester carbon chain links and configurations.

LUBRICANTS CONTAINING THE NOVEL HYDROXY THIOPHOSPHONOXY GLYCERIDE REACTION PRODUCTS

In the lubricating oil compositions containing the hydroxy thiophosphonoxy glyceride reaction products of the invention, hydrocarbon mineral oil may be employed as base materials such as paraffin base, naphthene base, or mixed paraffin base distillate or residual oils. The paraffin base distillate lubricating oil fractions are used in the formulation of premium grade motor oils, such as contemplated in this invention. Lubricating mineral oil base has generally been subjected to solvent refining to improve its lubricity and viscosity-temperature relationship as well as solvent dewaxing to remove waxy components and improve the pour of the oil. Broadly speaking, a mineral lubricating oil having an SUS viscosity at 100° F. between 50 and 1000 may be used in the formulation of the improved lubricants of this invention. Usually the viscosity range falls between 70 and 300 at 100° F. The mineral lubricating oils containing the glyceride reaction products of the invention usually contain other additives designed to impart other desirable properties thereto. For example, V.I. improvers such as polymethacrylates are normally included therein as are corrosion inhibitors and other detergents.

A widely used V.I. improver is a polymethacrylate having the general formula:

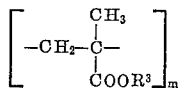

wherein $R^3$ is an aliphatic radical of from 1 to 20 carbons and $m$ is an integer between 600 and 35,000.

A commonly used supplementary detergent is an alkaline earth metal alkylphenolate. Barium nonylphenolate, barium dodecylmethylphenolate and calcium dodecylphenolate are examples of such detergents. These products which are well known detergent additives are usually present in the lubricating oil in a concentration between 0.1 and 5 wt. percent.

The most commonly used supplementary inhibitor and antioxidant is a divalent metal dialkyl dithiophosphate resulting from neutralization of a $P_2S_5$-alcohol reaction product with a divalent metal or divalent metal oxide. Barium and zinc dialkyl dithiophosphates are widely used oxidation and corrosion inhibitors. Metal dialkyl dithiophosphates are usually present in the lubricant in a concentration between 0.1 and 3 wt. percent.

Synthetic lubricating bases of the ester or ether type may also be used as the lubricating base oil. High molecular weight high boiling liquid aliphatic dicarboxylic esters possess excellent viscosity-temperature relationships and lubricating properties and are finding ever-increasing utilization in lubricating oils adapted for high and low temperature lubrications. Esters of this type are used in the formulation of jet engine oils.

The hydroxy thiophosphonoxy glyceride reaction products are present in the lubricating oil in concentrations sufficient to impart dispersant properties thereto. In concentrations used in the formulation of finished lubricants the concentration of the glyceride reaction product can be as high as 50%. In finished lubricants the concentration of the additive falls between 0.2 and 10 wt. percent with a concentration between 1 and 5 wt. percent normally employed.

Example I illustrates the preparation of the hydrocarbonthiophosphonic acid reactant from polybutene and $P_2S_5$. Examples II and III demonstrate the preparation of the hydroxy thiophosphonoxy glyceride reaction products from hydrocarbonthiophosphonic acid and the epoxidized unsaturated fatty acid triester glycerides. Example IV illustrates the lubricant additive properties of the hydroxy thiophosphonoxy glyceride reaction products of the invention and the glyceride reaction products containing lubricant compositions. It is to be noted that the "Calculated" values are based on an oil raffinate solution wherein all the reactants fully reacted and where the X radical in the

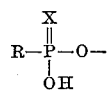

group is 100% sulfur.

*Example 1*

Polyisobutene(1100 M.W.)thiophosphonic acid is prepared by reacting polyisobutylene having an average molecular weight of about 1100 with $P_2S_5$ in a mole ratio of polyisobutylene to $P_2S_5$ of 1:1 and in the presence of sulfur in an amount equal to 1.3 wt. percent of the polyisobutylene. After reaction at 232° C., until the mixture is soluble in n-pentane, the reaction product is diluted with approximately 150 wt. percent of a naphthene base oil having an SUS viscosity at 100° F. of 100, steamed at 176° C. for 10 hours in a nitrogen atmosphere, and then dried by the passage of nitrogen therethrough at 176° C. The hydrolyzed product is extracted with 50% by volume of methyl alcohol at 60° C. to give a methanol extract containing inorganic phosphorus acids in a lubricating oil raffinate containing polybutene(1100 M.W.)thiophosphonic acid which after stripping free of methanol has a Neut. No. of 22.6.

The theoretical percent sulfur in the oil raffinate containing a thiophosphonic acid structure of the formula:

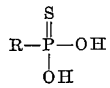

where R is a polybutene radical (1100 M.W.), is 1.0 wt. percent. The percent sulfur in the thiophosphonic acid raffinate product is 0.51 wt. percent indicating said product is of the formula:

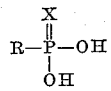

where X is a mixture of a major amount of sulfur and a minor amount of oxygen and R is as heretofore defined.

Example II

Polyisobutene(1100 M.W.)thiophosphonic acid in oil solution of the type prepared in the manner of Example I in the amount of 1,000 grams (0.286 mole based on Neut. No.) is charged to a liter 3-necked flask fitted with a stirrer, reflux condenser and a thermometer. To the flask there is added 64 grams (0.068 mole) of epoxidized soybean oil, that is, soybean oil where all the olefinic double bonds are replaced by epoxy groups. The epoxidized soybean oil has the following properties: Sap. No.=179; wt. percent oxirane oxygen=7; Iodine No.=3. The reaction mixture is heated to 121° C. for 43¾ hours and then an addition 64 grams (0.068 mole) of epoxidized soybean oil is added. The reaction mixture is heated at 121° C. for an additional 2 hours. The product analyzed as follows:

| Description | Calculated | Found |
|---|---|---|
| Phosphorus, wt. percent | 0.78 | 0.83 |
| Hydroxyl No | 14 | 20 |
| Neut. No | 0 | 0.56 |
| Sulfur, wt. percent | 0.81 | 0.42 |

Example III

Polyisobutene(1100 M.W.)thiophosphonic acid in oil solution of the type prepared in Example I in the amount of 680 grams (0.25 mole based on Neut. No.) is charged to a three liter, three-necked flask equipped with a stirrer, thermometer and reflux condenser. The thiophosphonic acid is heated to 121° C. and 45 grams (0.046 mole) of an epoxy glyceride of the formula:

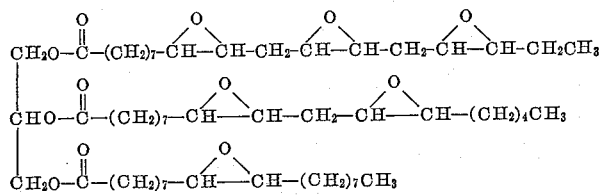

is added over a ½ hour period. Heating at this temperature is continued for an additional hour and then an additional 45 grams (0.046 mole) of the aforedescribed glyceride is added over a ¼ hour period. Heating at 121° C. is then continued for another 4½ hours. The final product is a brown colored liquid. The hydroxy thiophosphonoxy glyceride product analyzed as follows:

| Description | Calculated | Found |
|---|---|---|
| Phosphorus, wt. percent | 1.1 | 0.93 |
| Hydroxyl No | 25 | 21 |
| Neut. No | 0 | 0.78 |
| Sulfur, wt. percent | 1.0 | 0.50 |

Example IV

This example illustrates the lubricant compositions of the invention and the outstanding dispersant properties of the hydroxy thiophosphonoxy glyceride reaction products of the invention in lubricants.

In the well known CLR Low Temperature Sludge Test, an SAE 10W–30 motor oil containing the hydroxy thiophosphonoxy glyceride reaction product produced in Example II is tested. In the table directly below, Oil A is an example of the lubricant of the invention and Oil B is the control.

TEST COMPOSITIONS

| Description | Oil A | Oil B |
|---|---|---|
| Refined Paraffinic Distillate Oil, wt. percent (SUS Visc. at 100° F.=100) | 89.90 | 92.72 |
| Hydroxy Thiophosphonoxy Glyceride Reaction Product Oil Solution of Example II | 2.82 | 0 |
| Barium $C_{12}$ alkylphenolate, wt. percent | 1.83 | 1.83 |
| Zinc isopropyl 1,3-dimethylbutyl dithiophosphate, wt. percent | 0.88 | 0.88 |
| Mineral oil concentrate containing 25 wt. percent of a copolymer of mixed methacrylate alkyl esters in which the alkyl group range from butyl to octadecyl, wt. percent | 4.00 | 4.00 |
| $CO_2$ neutralized sulfurized basic barium sulfonate in oil, wt. percent | 0.57 | 0.57 |
| Dimethylsilicone anti-foam concentrate, p.p.m | 150 | 150 |

The CLR sludge engine test results for the above formulations are as follows:

CLR SLUDGE TEST DATA [1]

| Test Time, Hours | Oil A | Oil B |
|---|---|---|
| 38 |  | 6.9 |
| 54 | 9.4 | 5.4 |
| 70 | 7.4 |  |
| 94 | 6.2 |  |
| 110 | 5.4 |  |

[1] Clean oil rating=10.

As can be seen from the above table, the hydroxy thiophosphonoxy glyceride reaction products of the invention substantially inhibit the formation of sludge in engine oils.

We claim:
1. A lubricating oil containing a hydroxy phosphorus containing glyceride in an amount sufficient to impart the detergent properties thereto, said phosphorus containing glyceride produced by contacting an acid member selected from the group consisting of

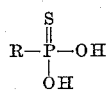

and a mixture of a major portion of

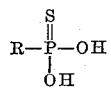

and a minor portion of

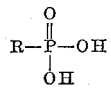

where R is a radical derived from a polyolefin having an average molecular weight between about 250 and 50,000, with an epoxidized unsaturated fatty acid triester glyceride of the formula:

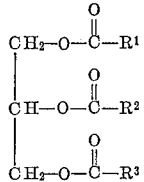

where $R^1$, $R^2$ and $R^3$ are saturated aliphatic hydrocarbon radicals of from 3 to 17 carbons having at least one epoxy group therein, at a temperature between about 50 and 200° C. in a mole ratio of said triester glyceride to said acid member of between about 1:1.0 and 1.0:1.0.

2. A lubricating oil in accordance with claim 1 wherein said acid member is said mixture.

3. A lubricating oil in accordance with claim 1 wherein said phosphorus containing glyceride is present in a concentration of between 0.2 and 10 wt. percent.

4. A lubricating oil in accordance with claim 1 wherein said phosphorus containing glyceride is present in a concentration between 0.2 and 10 wt. percent and said lubricating oil is mineral lubricating oil having an SUS viscosity at 100° F. between 50 and 1000.

5. A lubricating oil in accordance with claim 4 wherein R is a polybutene derived radical, said acid member is said mixture and said triester glyceride is of the formula:

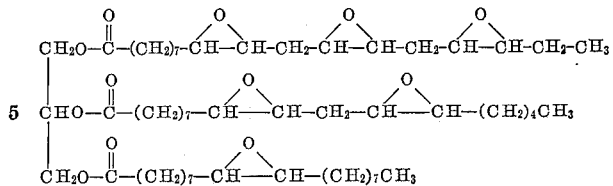

6. A lubricating oil in accordance with claim 4 wherein R is a polybutene derived radical, said acid member is said mixture and said triester glyceride is:

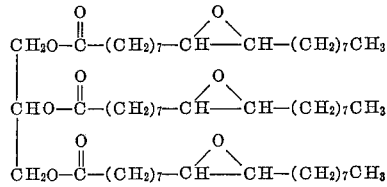

7. A lubricating oil in accordance with claim 4 wherein R is a polybutene derived radical and said triester glyceride is epoxidized soybean oil.

References Cited by the Examiner
UNITED STATES PATENTS

| | | | |
|---|---|---|---|
| 2,490,748 | 12/1949 | Dickey et al. | 260—403 |
| 2,965,657 | 12/1960 | Findley | 260—403 |
| 3,042,687 | 7/1962 | Chatfield et al. | 260—348 |
| 3,123,630 | 3/1964 | Oberender et al. | 252—46.6 |
| 3,162,671 | 12/1964 | Petersen et al. | 252—46.6 |

DANIEL E. WYMAN, *Primary Examiner.*

L. G. XIARHOS, *Assistant Examiner.*